(12) United States Patent
Morgan et al.

(10) Patent No.: US 7,058,408 B2
(45) Date of Patent: Jun. 6, 2006

(54) METHOD AND APPARATUS FOR ENABLING DISCONTINUOUS TRANSMISSION FEATURE ON A MOBILE STATION

(75) Inventors: William Morgan, Marengo, IL (US); Michael J. Kinnavy, Park Ridge, IL (US); Chad W. Bohlmann, Oak Park, IL (US)

(73) Assignee: Motorola, Inc., Schaumburg, IL (US)

( * ) Notice: Subject to any disclaimer, the term of this patent is extended or adjusted under 35 U.S.C. 154(b) by 606 days.

(21) Appl. No.: 10/052,828

(22) Filed: Oct. 25, 2001

(65) Prior Publication Data

US 2003/0083057 A1    May 1, 2003

(51) Int. Cl.
*H04Q 7/20* (2006.01)
(52) U.S. Cl. .................. 455/450; 455/453; 455/446; 455/452.1
(58) Field of Classification Search ............... 455/522, 455/422.1, 77, 447, 450, 453, 515, 446, 452.1 455/455
See application file for complete search history.

(56) References Cited

U.S. PATENT DOCUMENTS

| | | | |
|---|---|---|---|
| 5,625,872 A | | 4/1997 | Sawyer |
| 6,011,960 A | * | 1/2000 | Yamada et al. ............... 455/77 |
| 6,108,550 A | * | 8/2000 | Wiorek et al. ............... 455/447 |
| 6,370,392 B1 | * | 4/2002 | Li et al. ...................... 455/522 |
| 6,496,706 B1 | * | 12/2002 | Jou et al. ..................... 455/522 |
| 6,590,874 B1 | * | 7/2003 | Wang et al. ................. 370/318 |
| 2003/0021255 A1 | * | 1/2003 | Harris ......................... 370/342 |
| 2003/0040315 A1 | * | 2/2003 | Khaleghi et al. ............ 455/435 |
| 2003/0114177 A1 | * | 6/2003 | Sinnarajah et al. ......... 455/515 |

FOREIGN PATENT DOCUMENTS

EP    0 480 896 A2    4/1992

OTHER PUBLICATIONS

*cdma2000™ Overview*, Nov. 1999, QUALCOMM.®.
International Search Report PCT/US02/30140 dated Apr. 10, 2003.

* cited by examiner

*Primary Examiner*—Joseph Feild
*Assistant Examiner*—Huy D. Nguyen

(57) ABSTRACT

In accordance with the preferred embodiments of the present invention, a method (400) and an apparatus for enabling discontinuous transmission feature on a mobile station (150) are described herein. The apparatus generally includes a transmitting unit (320) and a controller (330). The controller (330) is operable to control transmission of mobile information via a first communication resource of a reverse link (210) in response to a trigger event. Accordingly, the transmitting unit (320) is operable to transmit mobile information via a second communication resource of the reverse link (210). The second communication resource is operable for discontinuous transmission.

37 Claims, 3 Drawing Sheets

```
┌──────────────────────────────────────────┐
│   CONTROL TRANSMISSION OF MOBILE         │
│ INFORMATION VIA A FIRST COMMUNICATION    │
│      RESOURCE OF A REVERSE LINK          │
└──────────────────────────────────────────┘
                    │
                   410
                              420
┌──────────────────────────────────────────┐
│   TRANSMIT MOBILE INFORMATION VIA        │
│   A SECOND COMMUNICATION RESOURCE        │
│         OF THE REVERSE LINK              │
└──────────────────────────────────────────┘
```

400

100

METHOD AND APPARATUS FOR ENABLING DISCONTINUOUS TRANSMISSION FEATURE ON A MOBILE STATION

FIELD OF THE INVENTION

The present invention relates to wireless communication systems, and more particularly, to a method and an apparatus for enabling discontinuous transmission feature on a mobile station.

BACKGROUND OF THE INVENTION

A wireless communication system is a complex network of systems and elements. Typically elements include (1) a radio link to the mobile stations (e.g., cellular telephones), which is usually provide by at least one and typically several base stations, (2) communication links between the base stations, (3) a controller, typically one or more base station controllers or centralized base station controllers (BSC/CBSC), to control communication between and to manage the operation and interaction of the base stations, (4) a call controller (e.g., a mobile switching center (MSC)) or switch, typically a call agent (i.e., a "softswitch"), for routing calls within the system, and (5) a link to the land line or public switch telephone network (PSTN), which is usually also provided by the call agent.

Typically, a mobile station communicates with a base station via a reverse link. In particular, the reverse link includes a number of channels such as a reverse pilot channel, a reverse fundamental channel (R-FCH), and a reverse dedicated control channel (R-DCCH). In IS2000 cellular systems, for example, the reverse pilot channel is always used for transmission of power control, synchronization, and may be used for location information associated with the mobile station. In contrast, the reverse fundamental channel and the reverse dedicated control channel may or may not be used depending on the service provided to the mobile station. The reverse fundamental channel is used primarily for transmission of traffic information such as voice or data input from the mobile station during a call whereas the reverse dedicated control channel is used for transmission of control information and data. Even though the reverse fundamental channel may also be used for transmission of control information by embedding that information within the traffic information, the reverse dedicated control channel operates at lower average power than the reverse fundamental channel to transmit such information to a base station. In particular, the reverse dedicated control channel may be operable for discontinuous transmission (i.e., no transmission of audio or data information from the mobile station) to reduce power consumption.

One aspect of designing a wireless communication system is to optimize the resources available to the wireless communication system. For example, a mobile station user typically makes selections to retrieve voice mails or information regarding a bank account by simply pressing keys on the mobile station such that voice input is not necessary. Touch tones such as dual-tone multiple frequency (DTMF) tones are generated in response to the selections made by the user. Accordingly, encoded DTMF messages corresponding to the DTMF tones are transmitted by the mobile station to the base station via the reverse fundamental channel of the reverse link. In this case, unnecessary information such as encoded audio information generated from the user's voice and background noise are also transmitted along with the tones via the reverse link. As a result, interference is increased as more of the reverse link capacity is occupied to transmit the unnecessary information. Further, control information from a mobile station may be transmitted as needed whereas encoded audio information may be transmitted continuously. Thus, more power is consumed by the mobile station to transmit encoded audio information when a voice input is not required to be sent. Control information sent on an as needed basis where as voice information is always sent.

Therefore, a need exists to control the reverse link to limit the transmission of unnecessary information to reduce interference within the communication system and to reduce mobile station power consumption.

DETAILED DESCRIPTION OF THE PREFERRED EMBODIMENTS

Preferred embodiments of a method and an apparatus for enabling discontinuous transmission feature on a mobile station are described. In a wireless communication system, the mobile station communicates with a base station via a reverse link, and the base station communicates with the mobile station via a forward link. The mobile station controls transmission of mobile information via a first communication resource of the reverse link in response to a trigger event. In particular, the mobile information may be, but is not limited to, control information (e.g., encoded DTMF messages associated with DTMF tones) and traffic information (e.g., encoded audio information). The trigger event may be, but is not limited to, a user-selectable input, a call setup of a telephone number, a busy tone associated with a dialed telephone number, and a voice input. The mobile station may terminate transmission of mobile information via the first communication resource such as a reverse fundamental channel and a reverse traffic channel. Further, the mobile station may transfer control information from the first communication resource over to a second communication resource for transmission to the base station. Accordingly, the mobile station transmits control information via the second communication resource such as a reverse dedicated control channel to the base station.

Figure 1:
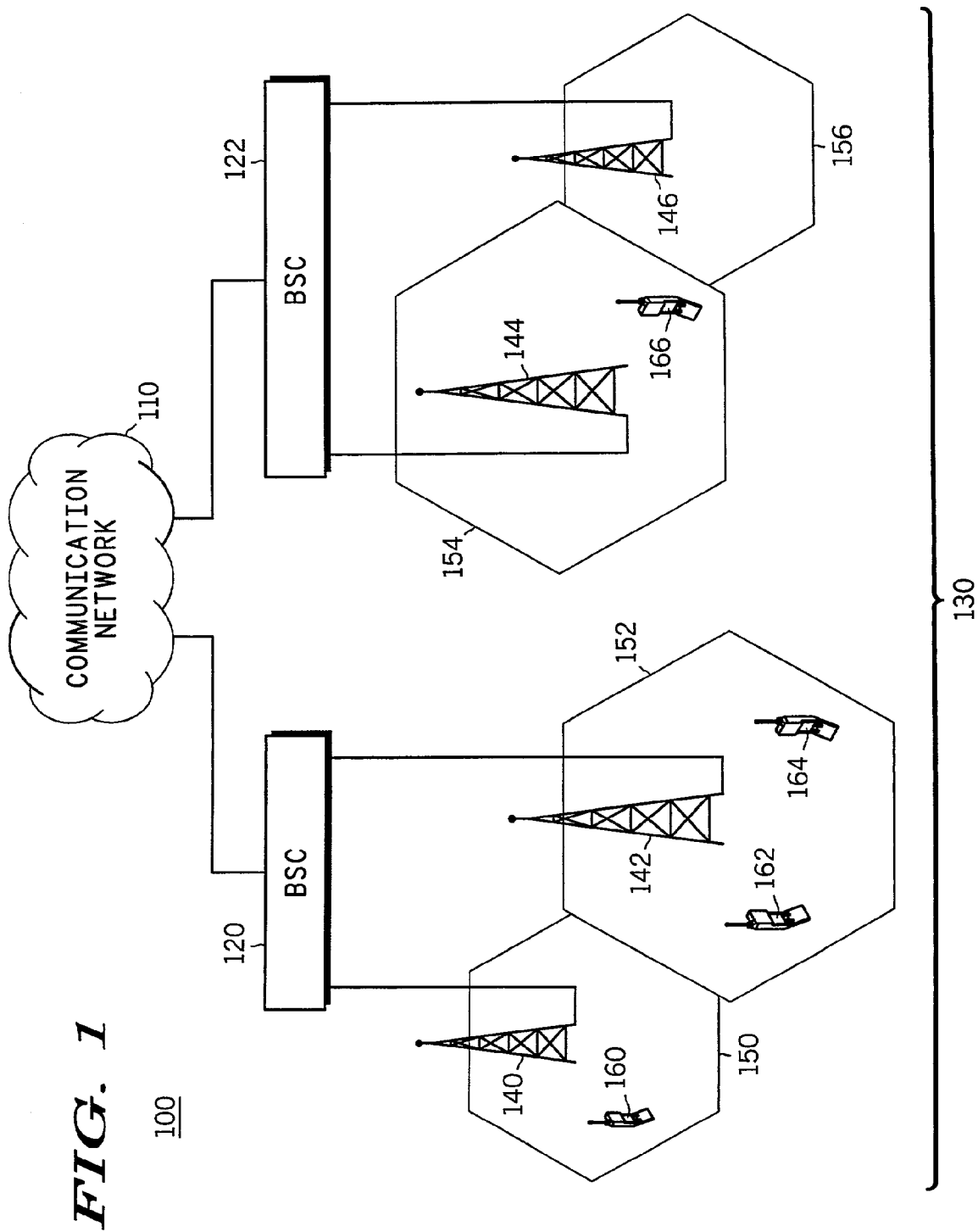
FIG. 1 is a block diagram representation of a wireless communication system that may be adapted to operate in accordance with the preferred embodiments of the present invention.

The communication system in accordance with the present invention is described in terms of several preferred embodiments, and particularly, in terms of a wireless communication system operating in accordance with at least one of several standards. These standards include analog, digital or dual-mode communication system protocols such as, but not limited to, the Advanced Mobile Phone System (AMPS), the Narrowband Advanced Mobile Phone System (NAMPS), the Global System for Mobile Communications (GSM), the IS-55 Time Division Multiple Access (TDMA) digital cellular, the IS-95 Code Division Multiple Access (CDMA) digital cellular, CDMA 2000, the Personal Communications System (PCS), 3G, the Universal Mobile Telecommunications System (UMTS) and variations and evolutions of these protocols. As shown in FIG. 1, a wireless communication system 100 includes a communication network 110, a plurality of base station controllers (BSC), generally shown as 120 and 122, servicing a total service area 130. The wireless communication system 100 may be, but is not limited to, a frequency division multiple access (FDMA) based communication system, a time division multiple access (TDMA) based communication system, and code division multiple access (CDMA) based communication system. As is known for such systems, each BSC 120 and 122 has associated therewith a plurality of base stations (BS), generally shown as 140, 142, 144, and 146, servicing communication cells, generally shown as 150, 152, 154, and 156, within the total service area 130. The BSCs 120 and 122, and base stations 140, 142, 144, and 146 are specified and operate in accordance with the applicable standard or standards for providing wireless communication services to mobile stations (MS), generally shown as 160, 162, 164, and 166, operating in communication cells 150, 152, 154, and 156, and each of these elements are commercially available from Motorola, Inc. of Schaumburg, Ill.

Figure 2:
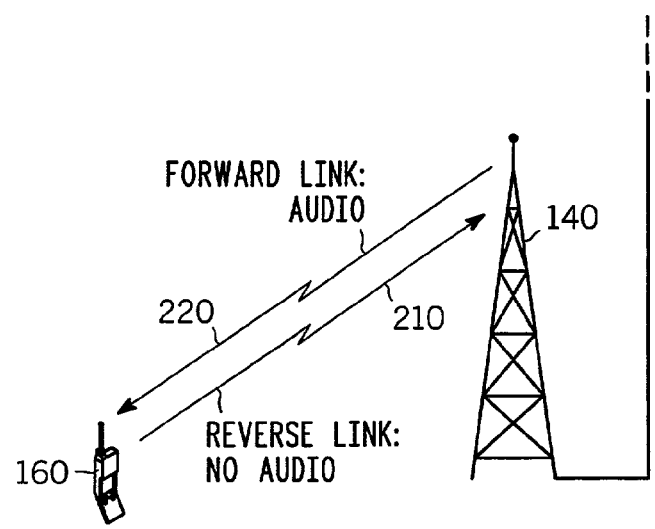
FIG. 2 is a block diagram representation of a communication cell that may be adapted to operate in accordance with the preferred embodiments of the present invention.

Referring to FIG. 2, the communication cell 150 generally includes the base station 140 and a plurality of mobile stations with one shown as 160. The base station 140 provides communication service to the plurality of mobile stations such as mobile station 160 within the communication cell 150 (i.e., the coverage area of the base station 140). Typically, the mobile station 160 communicates with the base station 140 via a reverse link 210 whereas the base station 140 communicates with the mobile station 160 via a forward link 220. In particular, the reverse link 210 includes a plurality of communication resources such as, but not limited to, a reverse pilot channel, a reverse fundamental channel (R-FCH), and a reverse dedicated control channel (R-DCCH). Each of the plurality of communication resources is operable for different functions. For example, the reverse fundamental channel may be operable for transmission of traffic information such as encoded audio information and data information at full rate, half rate, quarter rate, or eighth rate. In addition, control information may also be transmitted via the reverse fundamental channel. The reverse dedicated control channel may be operable for transmission of control information at full rate. Further, the reverse dedicated control channel may be operable for discontinuous transmission, i.e., no voice input from the mobile station 160.

To reduce interference within the communication system (shown as 100 in FIG. 1) and to conserve power, the mobile station 160 may be operable for discontinuous transmission when voice input is not necessary to receive traffic information from the base station 140 via the forward link 220. For example, a user of the mobile station 160 may retrieve information such as, but not limited to, voice mails and balances to various accounts (e.g., checking account and credit card account) without having to say a word (i.e., no voice input). In particular, the mobile station 160 may originate a call to a telephone number and the user may select for the discontinuous transmission feature on the mobile station 160. As a result, no encoded audio information is transmitted by the mobile station 160 to base station 140. Accordingly, traffic information (e.g., encoded audio information) is transmitted from the base station 140 to the mobile station 160 via the forward link 220 without transmission of encoded audio information from the mobile station 160 via the reverse link 120. In an alternate embodiment, the discontinuous transmission feature may be automatically triggered by a call setup of a particular telephone number, e.g., a telephone number for voice message retrieval service.

Figure 3:
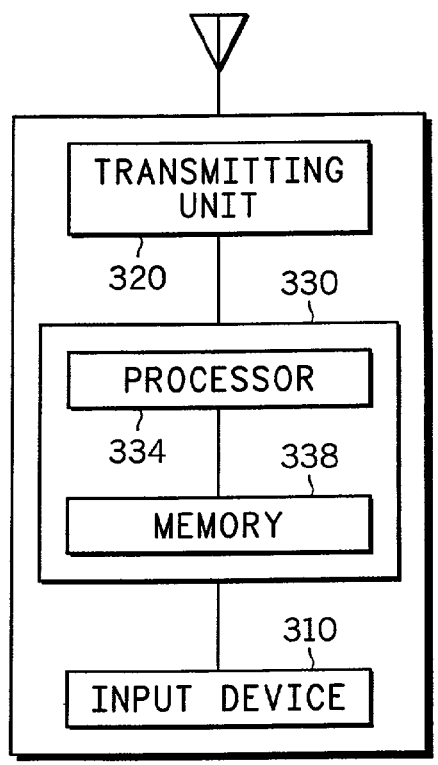
FIG. 3 is a block diagram representation of a mobile station that may be adapted to operate in accordance with the preferred embodiments of the present invention.

As shown in FIG. 3, a mobile station 160 is adapted in accordance with a preferred embodiment of the invention to enable the discontinuous transmission feature. The mobile station 160 generally includes a user input device 310, a transmitting unit 320, and a controller 330. The user input device 310 may be, but is not limited to, a numeric keypad, an alphanumeric keypad, and a touch-sensitive display. Further, the user input device 310 and the transmitting unit 320 are operatively coupled to the controller 330, which includes, but is not limited to, a processor 334 and a memory 338. The processor 334 is operatively coupled to the memory 338, which stores a program or a set of operating instructions for the processor 334. The processor 334 executes the program or the set of operating instructions such that the mobile station 150 operates in accordance with a preferred embodiment of the invention. The program or the set of operating instructions may be embodied in a computer-readable medium such as, but not limited to, paper, a programmable gate array, application specific integrated circuit, erasable programmable read only memory, read only memory, random access memory, magnetic media, and optical media.

A basic flow for enabling the discontinuous transmission feature on the mobile station 160 that may be applied with the preferred embodiment of the present invention shown in FIG. 3 may start with the controller 330 controlling transmission of mobile information via a first communication resource of the reverse link 210 (shown in FIG. 2) in response to a trigger event. In particular, the trigger event may be, but is not limited to, a user-selectable input (e.g., a user pressing a key on the mobile station), a call setup of a particular telephone number, a busy tone associated with a telephone number, and a voice input from the user. The mobile information may be, but is not limited to, control information and traffic information. For example, the controller 330 may terminate transmission of mobile information via the first communication resource such as a reverse fundamental channel and a reverse traffic channel of the reverse link 210 in response to a user of the mobile station 160 pressing a key on the input device 310 (e.g., a numeric pad). In another example, the controller 330 may automatically terminate transmission of mobile information via the reverse fundamental channel in response to the user dialing a telephone number that provides voice-mail retrieval service. In yet another example, the controller 330 may terminate transmission of mobile information via the reverse fundamental channel in response to a voice input from the user, i.e., the discontinuous transmission feature is voice activated. Further, the controller 320 is operable to transfer the control information from the first communication resource over to a second communication resource such as a reverse dedicated control channel. Accordingly, the transmitting unit 320 transmits the control information to a base station 140 via the reverse dedicated control channel. As a result, the mobile station 160 may receive transmission of traffic information (e.g., encoded audio information) via the forward link 220 from the base station 140 without transmitting encoded audio information via the reverse fundamental channel.

Figure 4:
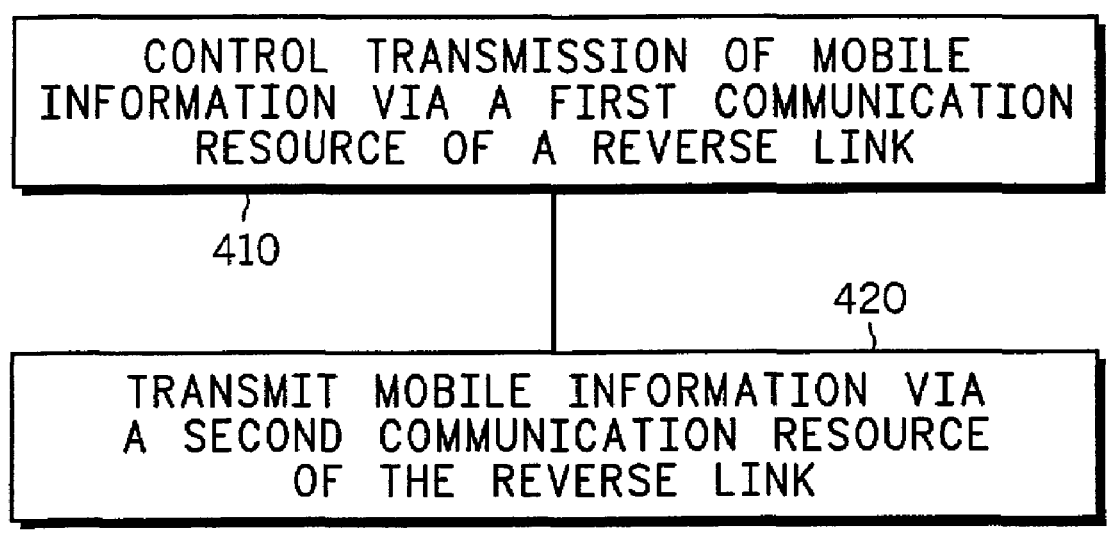
FIG. 4 is a flow diagram illustrating a method for enabling discontinuous transmission feature on a mobile station in accordance with the preferred embodiments of the present invention.

In accordance with the preferred embodiments of the present invention, and with references to FIG. 4, a method 400 for enabling discontinuous transmission feature on a mobile station in a wireless communication system is shown. Method 400 begins at step 410, where a controller of the mobile station controls transmission of mobile information via a first communication resource of a reverse link in response to a trigger event. For example, the trigger event may be a user of the mobile station pressing a key associated with the discontinuous transmission feature, i.e., no encoded audio information from the mobile station. In particular, the controller may terminate transmission of mobile information via a reverse fundamental channel of the reverse link. The mobile information may be, but is not limited to, traffic information (e.g., encoded audio information) and control information (e.g., encode DTMF messages associated with DTMF tones). Further, the controller may transfer the control information from the reverse fundamental channel over to a second communication resource of the reverse link for transmission. Accordingly, at step 420, the control information is transmitted to a base station by the mobile station via the second communication resource. For example, the control information is transmitted via a reverse dedicated control channel of the reverse link. As a result, interference within the communication system may be reduced and mobile station power may be conserved by operating the discontinuous feature of the mobile station.

Many changes and modifications could be made to the invention without departing from the fair scope and spirit thereof. The scope of some changes is discussed above. The scope of others will become apparent from the appended claims.

What is claimed:

1. In a wireless communication system, the communication system providing communication service to a mobile station, wherein the mobile station is in communication with a base station via a reverse link, a method for enabling discontinuous transmission feature on the mobile station, the method comprising:
   discontinuing transmission of mobile information via a first communication resource of the reverse link in response to a trigger event wherein the trigger event indicates that use of the first communication resource is not necessary; and
   transmitting mobile information to the base station via a second communication resource of the reverse link, the second communication resource being operable for discontinuous transmission.

2. The method of claim 1, wherein discontinuing transmission of mobile information via a first communication resource of the reverse link in response to a trigger event comprises discontinuing transmission of mobile information via a first communication resource of the reverse link in response to one of a user-selectable input, a call setup of a telephone number, a busy tone associated with a dialed telephone number, and a voice input.

3. The method of claim 1, wherein discontinuing transmission of mobile information via a first communication resource of the reverse link in response to a trigger event comprises discontinuing the transmission of mobile information via a reverse fundamental channel of the reverse link in response to a trigger event.

4. The method of claim 1, wherein discontinuing transmission of mobile information via a first communication resource of the reverse link in response to a trigger event comprises transferring transmission of mobile information via a first communication resource over to a second communication resource of the reverse link in response to a trigger event.

5. The method of claim 1, wherein discontinuing transmission of mobile information via a first communication resource of the reverse link in response to a trigger event comprises transferring transmission of mobile information via a reverse fundamental channel over to a reverse dedicated control channel of the reverse link in response to a trigger event.

6. The method of claim 1, wherein transmitting mobile information to the base station via a second communication resource of the reverse link comprises transmitting control information to the base station via a second communication resource of the reverse link.

7. The method of claim 1, wherein transmitting mobile information to the base station via a second communication resource of the reverse link comprises transmitting one of an encoded dual-tone multiple frequency (DTMF) message associated with a DTMF tone and a pilot strength measurement to the base station via a second communication resource of the reverse link.

8. The method of claim 1, wherein transmitting mobile information to the base station via a second communication resource of the reverse link comprises transmitting one of an encoded dual-tone multiple frequency (DTMF) message associated with a DTMF tone and a pilot strength measurement to the base station via a reverse dedicated control channel of the reverse link.

9. The method of claim 1, wherein the communication system comprises a code division multiple access (CDMA) based communication system.

10. In a communication system, the communication system providing communication service to a mobile station, wherein the mobile station is in communication with a base station via a reverse link, an apparatus for enabling discontinuous transmission feature on the mobile station, the apparatus comprising:
    a user input device;
    a transmitting unit being operable to transmit mobile information via the reverse link; and
    a controller operatively coupled to the user input device and the transmitting unit, the controller comprising a processor and a memory operatively coupled to the processor,
    the controller being programmed to discontinue transmission of mobile information via a first communication resource of the reverse link in response to a trigger event wherein the trigger event indicates that use of the first communication resource is not necessary, and
    the controller being programmed to transmit mobile information to the base station via a second communication resource of the reverse link, the second communication resource being operable for discontinuous transmission.

11. The apparatus of claim 10, wherein the user-input device comprises a numeric keypad, an alphanumeric keypad, and a touch-sensitive display.

12. The apparatus of claim 10, wherein the trigger event comprises one of a use-selectable input, dialing of a particular telephone number, a busy tone associated with a telephone number, and a voice input.

13. The apparatus of claim 10, wherein the first communication resource comprises one of a reverse fundamental channel and a reverse traffic channel.

14. The apparatus of claim 10, wherein the second communication resource comprises a reverse dedicated control channel.

15. The apparatus of claim 10, wherein the mobile information comprises one of control information and traffic information.

16. The apparatus of claim 15, wherein the control information comprises one of an encoded dual-tone multiple frequency (DTMF) message associated with a DTMF tone and a pilot strength measurement.

17. The apparatus of claim 10, wherein the apparatus operates in accordance with a code division multiple access (CDMA) protocol.

18. In a wireless communication system, the communication system for providing communication service for a mobile station, wherein the mobile station is in communication with a base station via a reverse link, and wherein a processor operates in accordance with a computer program embodied on a computer-readable medium for enabling discontinuous transmission on the mobile station, the computer program comprising:
   a first routine that directs the processor to discontinue transmission of mobile information via a first communication resource of the reverse link in response to a trigger event wherein the trigger event indicates that use of the first communication resource is not necessary; and
   a second routine that directs the processor to transmit mobile information to the base station via a second communication resource of the reverse link, the second communication resource being operable for discontinuous transmission.

19. The computer program of claim 18, wherein the first routine comprises a routine that directs the processor to control transmission of mobile information via a first communication resource of the reverse link in response to one of a user-selectable input, a call setup of a telephone number, a busy tone associated with a dialed telephone number, and a voice input.

20. The computer program of claim 18, wherein the first routine comprises a routine that directs the processor to discontinue transmission of mobile information via a reverse fundamental channel of the reverse link in response to a trigger event.

21. The computer program of claim 18, wherein the first routine comprises a routine that directs the processor to transfer transmission of mobile information via a first communication resource over to a second communication resource of the reverse link in response to a trigger event.

22. The computer program of claim 18, wherein the second routine comprises a routine that directs the processor to transfer transmission of mobile information via a reverse fundamental channel over to a reverse dedicated control channel of the reverse link in response to a trigger event.

23. The computer program of claim 18, wherein the second routine comprises a routine that directs the processor to transmit control information to the base station via a second communication resource of the reverse link.

24. The computer program of claim 18, wherein the second routine comprises a routine that directs the processor to transmitting one of an encoded dual-tone multiple frequency (DTMF) message associated with a DTMF tone and a pilot strength measurement to the base station via a second communication resource of the reverse link.

25. The computer program of claim 18, wherein the second routine comprises a routine that directs the processor to transmitting one of an encoded dual-tone multiple frequency (DTMF) message associated with a DTMF tone and a pilot strength measurement to the base station via a reverse dedicated control channel of the reverse link.

26. The computer program of claim 18, wherein the computer program operates in accordance with a code division multiple access (CDMA) protocol.

27. The computer program of claim 18, wherein the medium is one of paper, a programmable gate array, application specific integrated circuit, erasable programmable read only memory, read only memory, random access memory, magnetic media, and optical media.

28. In a wireless communication system, the communication system providing communication service to a mobile station, wherein the mobile station is in communication with a base station via a reverse link, the mobile station having a discontinuous transmission feature, the mobile station comprising:
   a user input device;
   a transmitting unit being operable to transmit mobile information via the reverse link; and
   a controller operatively couple to the user input device and the transmitting unit, the controller comprising a processor and a memory operatively coupled to the processor,
   the controller being programmed to discontinue transmission of mobile information via a first communication resource of the reverse link in response to a trigger event wherein the trigger event indicates that use of the first communication resource is not necessary, and
   the controller being programmed to transmit mobile information to the base station via a second communication resource of the reverse link, the second communication resource being operable for discontinuous transmission.

29. The mobile station of claim 28, wherein the user-input device comprises a numeric keypad, an alphanumeric keypad, and a touch-sensitive display.

30. The mobile station of claim 28, wherein the trigger event comprises one of a user-selectable input, dialing a particular telephone number, a busy tone associated with a telephone number, and a voice input.

31. The mobile station of claim 28, wherein the first communication resource comprises one of a reverse fundamental channel and a reverse traffic channel.

32. The mobile station of claim 28, wherein the second communication resource comprises a reverse dedicated control channel.

33. The mobile station of claim 28, wherein the mobile information comprises one of control information and traffic information.

34. The mobile station of claim 33, wherein the control information comprises one of an encoded dual-tone multiple frequency (DTMF) message associated with a DTMF tone and a pilot strength measurement.

35. The mobile station of claim 28, wherein the apparatus operates in accordance with a code division multiple access (CDMA) protocol.

36. In a wireless communication system, the communication system providing communication service to a mobile station, wherein the mobile station is in communication with a base station via a reverse link, a method for enabling discontinuous transmission feature on the mobile station, the method comprising:

terminating transmission of mobile information via a first communication resource of the reverse link in response to a trigger event including transferring transmission of mobile information via a reverse fundamental channel over to a reverse dedicated control channel of the reverse link in response to the trigger event; and transmitting mobile information to the base station via a second communication resource of the reverse link, the second communication resource being operable for discontinuous transmission, and wherein the trigger event indicates that use of the first communication resource is not necessary.

37. In a wireless communication system, the communication system for providing communication service for a mobile station, wherein the mobile station is in communication with a base station via a reverse link, and wherein a processor operates in accordance with a computer program embodied on a computer-readable medium for enabling discontinuous transmission on the mobile station, the computer program comprising:

a first routine that directs the processor to terminate transmission of mobile information via a first communication resource of the reverse link in response to a trigger event; and a second routine that directs the processor to transmit mobile information to the base station via a second communication resource of the reverse link, the second communication resource being operable for discontinuous transmission, and wherein the second routine includes a routine that directs the processor to transfer transmission of mobile information via a reverse fundamental channel over to a reverse dedicated control channel of the reverse link in response to a trigger event, and wherein the trigger event indicates that use of the first communication resource is not necessary.

* * * * *